United States Patent [19]

Bailly

[11] 3,912,436
[45] Oct. 14, 1975

[54] APPARATUS FOR EXTRUDING AND MOULDING PLASTIC MATERIAL

[76] Inventor: Michel Bailly, 28, rue du Point Haut-92, Suresnes, France

[22] Filed: Aug. 20, 1973

[21] Appl. No.: 389,556

[30] Foreign Application Priority Data
Aug. 23, 1972 France .............................. 72.30059

[52] U.S. Cl. ................ 425/327; 425/381; 425/465; 425/466
[51] Int. Cl.² ........................ B29D 7/02; B29D 7/04
[58] Field of Search ........... 425/325, 326, 327, 381, 425/465, 466, 378, 244

[56] References Cited
UNITED STATES PATENTS

| | | | |
|---|---|---|---|
| 1,350,722 | 8/1920 | Goodenberger | 425/466 |
| 1,443,324 | 1/1923 | McGovern | 425/466 |
| 3,015,129 | 1/1962 | Hays et al. | 425/141 |
| 3,105,270 | 10/1963 | Fibish | 425/327 X |
| 3,142,090 | 7/1964 | Hoffman | 425/466 |
| 3,527,851 | 9/1970 | Bulgin | 425/141 |
| 3,579,723 | 7/1969 | Brown | 425/326 X |
| 3,694,120 | 9/1972 | Walton | 425/327 X |
| 3,709,644 | 1/1973 | Farrell | 425/244 |
| 3,710,987 | 1/1973 | Bessho | 425/244 X |
| 3,753,636 | 8/1973 | Waterloo | 425/465 X |
| 3,761,553 | 9/1973 | Richardson | 425/141 |
| 3,809,518 | 5/1974 | Lloyd et al. | 425/244 |
| 3,810,728 | 5/1974 | Jacobs | 425/244 |

*Primary Examiner*—Francis S. Husar
*Assistant Examiner*—Carl Rowold
*Attorney, Agent, or Firm*—Waters, Schwartz & Nissen

[57] ABSTRACT

Apparatus for extruding a plastic material and moulding the thus extruded material to form a shaped product comprising feeding a mass of plastic material to an accumulation chamber where the mass is maintained in a plastic state, extruding the material from the accumulation chamber vertically downwards through an extrusion orifice to produce a sheet of said material whose weight corresponds approximately to the weight of the product to be formed, progressively increasing the width of the extrusion orifice, corresponding to the thickness dimension of the extruded sheet, during the duration of the extrusion of the sheet to compensate for "slip" phenomena and yield a sheet whose thickness is substantially uniform, and moulding the resulting sheet to form the desired shaped product.

14 Claims, 10 Drawing Figures

APPARATUS FOR EXTRUDING AND MOULDING PLASTIC MATERIAL

BACKGROUND a. Field of the Invention

The present invention relates to the particular technological field of combined extrusion and moulding of materials in the plastic state.

In the present description reference will be made to the "plastic state". This is intended to designate not only a pure plastic state, that is to say, a state in which a force acting on the material causes permanent deformation thereof, but also a state in which the permanent deformation is less than if the material was in a pure state. This diminution of deformation is due to the existence of a residual elasticity of the material. However, this elastic "memory" must be small in order for the material to be treated in accordance with the invention, which utilizes principles of the known techniques of combined extrusion and moulding. There is also used hereafter the term "sheet" in order to designate the extruded product and this can be a flat band or a profiled section.

The material in the plastic state which is useable according to the invention include deformable polymers, glass expanded foam, and rubber. Especially applicable are thermoplastic materials although this is not to be taken as limitative.

b. Prior Art

Various machines and methods are known for combined extrusion and moulding of vertical sheets of material in the plastic state.

Thus, French Pat. No. 1,436,900 describes a machine for continuous vertical extrusion in combination with two half moulds which are applied to the extruded sheet of plastic material to form the moulded product. The procedure is such that as the sheet is continuously extruded the moulds act while following the downward movement of said sheet.

U.S. Pat. No. 3,040,380 discloses a machine including two identical sections which operate in alternation.

Swiss Pat. No. 455,253 describes a machine which can operate periodically or continuously, the molds being movable vertically and horizontally.

The combined operation of extrusion and moulding is thus known in principle, but it has not been developed commercially because it is uneconomical due to its difficulties of utilization. Indeed, in the particular case when the moulded products are of substantial thickness several disadvantages appear, the most significant of which are as follows:

1. during the extrusion of the sheet of material in the plastic state, there is observed a flow characteristic phenomenon which alters the thickness of the sheet, and this alteration increases with greater thickness of the sheet. This phenomenon is disadvantageous and objectionable especially for continuous extrusion and moulding and it becomes necessary to cool the formed sheet before moulding. Such cooling takes a great time in the case of relatively thick sheets. The phenomenon also appears in the case of lower thicknesses, however, for thicknesses less than 1 mm it is less significant. In the case of thickness of sheets greater than 1 mm, when the sheet is extruded, the material at the surfaces of the sheet cools much more rapidly than at the core whereat the viscosity of the material becomes relatively lower enabling relative flow of material in the direction of extrusion by sliding, thereby producing internal stresses in the material resulting in irregularities in its thickness. This is referred to hereafter as a "slip" phenomenon.

2. during the moulding of the sheet to form the shaped product, there is observed, especially in the case where corners are formed, a thinning in the vicinity of these corners, because when the sheet is blown or vacuum formed towards the mould it initially takes a spherical shape with a uniform distribution of material and then when it contacts the mould at points of tangency of the spherical shape with the mould, the material is forced into contact with the mould over the totality of its surface to achieve the shape of the desired product. The portions of material at the corners of the mould are thus stretched and become reduced in thickness relative to the rest of the material.

Such disadvantages can be minimized, for example, by increasing the speed of extrusion of the sheet, this acting to diminish the slip phenomenon but also eliminating the formation of sheets of great thickness as for example in the proposed machine in the French patent cited above. It is also observed that if the extrusion speed is great, the formation speed of the extruded sheet is great and also the separation of the product from the remainder of the sheet by the half moulds up to the ejection of the shaped product must also be great.

In the case of substantial thicknesses, there is a limitation placed by the speed of cooling of the extruded sheet.

Another solution consists in stretching the extruded sheet by a particular movement of the mould members. However, this diminishes the thickness at the outset.

In order to avoid very small thicknesses at corners or bends in the product shaped in the mould and hence extreme weakness at such corners and bends, the sheet is extruded with a greater thickness. This solution is not very economical as the walls of the shaped product then become unnecessarily thick.

SUMMARY OF THE INVENTION

An object of the present invention is to provide apparatus by which the disadvantages associated with the prior art are overcome. In particular, the invention contemplates extrusion of a sheet of plastic material of a thickness sufficient to ultimately form shaped products of wall thickness greater than 1 mm, and specifically apparatus for such extrusion.

According to the invention, there is provided apparatus for effecting a method of extruding a plastic material and moulding the thus extruded material to form a shaped product, said method comprising feeding a mass of plastic material to an accumulation chamber where the mass is maintained in a plastic state, extruding material from said accumulation chamber vertically downwards through an extrusion orifice to produce a sheet of said material whose weight corresponds approximately to the weight of the product to be formed, said sheet of material tending to have a non-uniform thickness over its length due to slip phenomena of material flow, progressively increasing the width of the extrusion orifice, corresponding to the thickness dimension of the extruded sheet, during the duration of the extrusion of said sheet to compensate for said phenomena and yield a sheet whose thickness is substantially uniform, and moulding the resulting sheet to form the desired shaped product.

In further accordance with the invention, the method further comprises effecting a periodic local increase of the width of the extrusion orifice in addition to said progressive increase to produce local increases in thickness in the resulting extruded sheet at selected locations to compensate for thinning of the sheet during moulding.

A further feature of the invention comprises segregating from the extruded sheet a portion which is to form the shaped product and pressing at least part of said portion laterally into a mould to assist in the moulding of said product. The segregation of the portion to be moulded is effected by cutters which are external of the mould and are entrained thereby during mould closure or are independent thereof.

The above method of extrusion and moulding is particularly well adapted to the production of shaped products of uniform thickness such as, for example, gear casings, suitcases, parts of automobile bodies, ships etc. The method is also suitable for mass production as well as for manufacture of prototypes.

As previously stated, the problems of the slip phenomena are of particular importance for moulded products having a thickness of greater than 1 mm in which case it is necessary to extrude a sheet of great thickness. It is also of importance when moulding sheets of great size, such as several meters. When moulding low viscosity resins or resins which are reinforced or expanded, it is necessary to provide roller systems for effecting rapid displacement of the sheet.

According to the invention, the extrusion of a thick sheet or of large size is undertaken in discontinuous manner after an accumulation of material in the plastic state in the accumulation chamber. At the end of a time period corresponding to the moulding and solidification of the preceding shaped product, the material stored in the accumulation chamber (received from a supply source) is extruded in an amount by weight corresponding to the product to be formed. It is necessary that the head should be constructed such that the extruded sheets have uniform properties despite a high speed of extrusion.

DETAILED DESCRIPTION

Figure 1:
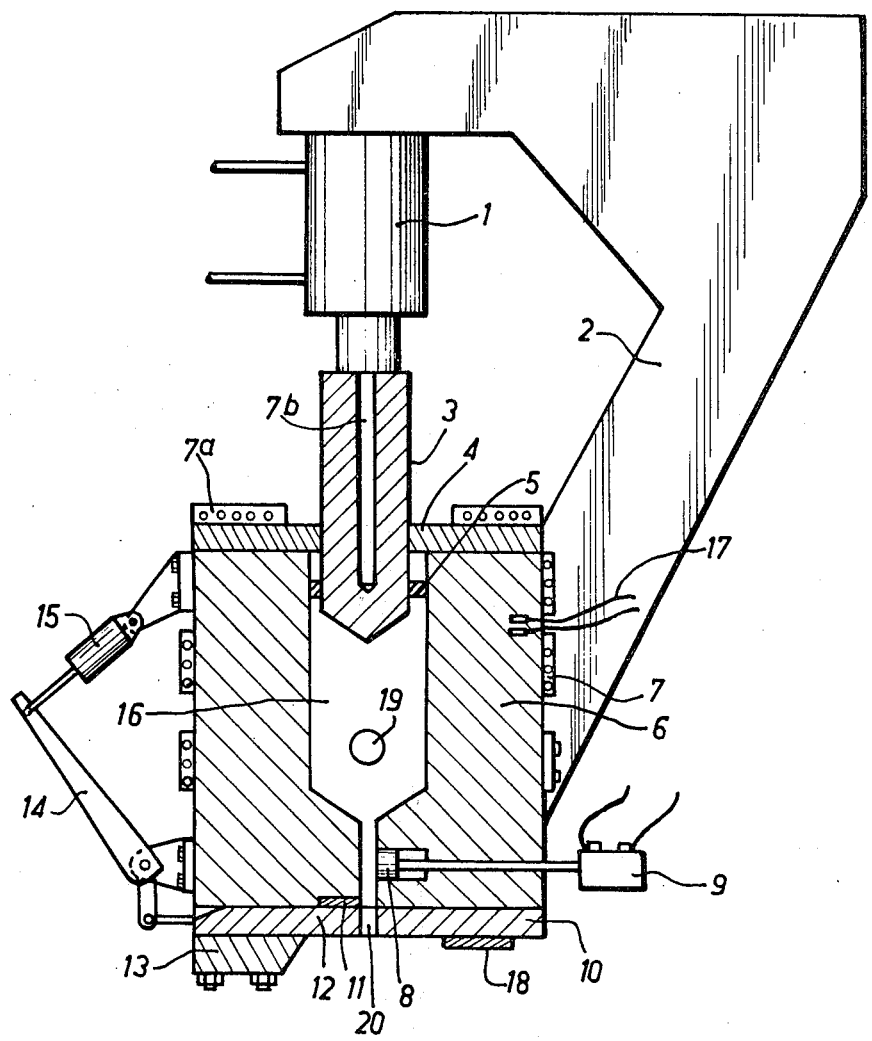
FIG. 1 is a side view showing in cross-section an assembly of an accumulation cavity for material in the plastic state and an extrusion head for the plastic material including movable lips.

Referring to FIG. 1 therein is seen a body 6 which contains an accumulation chamber 16 which is filled with material in the plastic state by means of a screw feeder or other similar device through an inlet feed orifice 19 which can be placed at any location along the surface of the chamber 16. An obturator 8 controlled by a mechanism 9 which, for example, can be a pneumatic cylinder, a piston system or a simple hydraulic jack, prevents the plastic mass from flowing out of the chamber 16 during the filling thereof. Although it is beneficial to fill chamber 16 at atmospheric pressure by lifting piston 3 by means of jack 1 fixed to frame 2 before filling the cavity with the material in the plastic state, it is also advantageous to apply a counter pressure by the piston 3 on the material to obtain a more homogeneous mass. The chamber 16 and the piston 3, as well, are maintained at a controlled temperature suitable to keep the material in the cavity in plastic state, by means of thermocouples designated by numeral 17. The thermocouples control the heating of electrical resistances 7a and/or the feed of steam into a channel 7b in piston 3. Between the outer surface of piston 3 and the wall of cavity 16 there is provided a clearance of 0.05 to 0.2 mm, and in order to guide the movement of the piston 3 in the cavity and obtain sealing of the cavity there are provided regulable guides 4 and sealing rings 5. The chamber 16, which serves as an accumulation chamber for the material in plastic state, and the piston 3 are generally of substantially rectangular shape. This shape, particularly of the piston, assures a uniform and equal delivery of material in the plastic state from one end to the other of lips 10 and 12 at the outlet or extrusion orifice 20 of cavity 16, whatever the material utilized, provided of course the material is not too fluid in which case the temperature must be lowered. In a modification of the assembly described above, a cylindrical piston is employed in which case a plate with an aperture replaces guides 4. This arrangement while being simplier in construction can cause stagnation of material which sometimes affects the quality of the mixture.

When the accumulation chamber 16 has received a predetermined quantity of material in the plastic state, which is regulable by the position of piston 3 during filling, the extrusion head is then ready for proceeding with the formation of a sheet product.

This can either be effected automatically or manually, and involves retraction of obturator 8 to unblock passage 20 at the same instant or slightly after piston 3 is caused to descend whereby there is obtained a free expulsion of the plastic material in pre-compressed state.

The nominal thickness of the resulting sheet of material which leaves orifice 20 can be regulated by adjusting the spacing between the lips by moving one or both of lips 10 or 12. In the described embodiment both lips are movable. The lips are formed as rectangular bodies.

It has been found that when a sheet of material is extruded from an extrusion orifice of fixed dimension, the resulting extruded sheet tends to have an irregular thickness over its length due to slip phenomena caused by non-uniform cooling of the sheet over its cross-section and consequent different viscosities. The slip phenomena can be compensated, according to the invention, by progressively displacing one or both lips to progressively enlarge the orifice. As a consequence, a substantially uniformly thick extruded sheet will be produced. The direction and speed of displacement of the lips can be regulated by means of hydraulic, mechanical or pneumatic control and can be effected manually or automatically. This displacement can be correlated with the displacement of the piston 3 either automatically or manually. In the disclosed embodiment a jack 15 acts on a lever system 14 to move the lips towards or away from one another as desired. Reference numeral 13 designates a part rigidly attached to body 6 containing the chamber 16 and part 13 and body 6 define a slot in which lip 12 is slidable. Lip 10 is thermally isolated by an insulator element designated by numeral 18.

A local enlargement or diminution of the thickness of the sheet can also be obtained by a superposition effect on the compensation movement of the lips. For example, the lip 12 can be subjected to a superposed movement, in one direction or the other, during discharge of the sheet. The direction and speed of the superposed displacement of the lip can be regulated independently or not from the direction and speed of the movement forming the progressively enlarging orifice 20. By means of such superposed or supplementary movement of one or both lips, there can be realized a local increase or decrease of the thickness of the sheet at the time of extrusion and before moulding in order to compensate for uneven thicknesses produced by the moulding operation caused by greater or lesser stretching of material at particular locations in the mould. There can thus be obtained products of more uniform thickness as will be explained later.

Figure 2A:
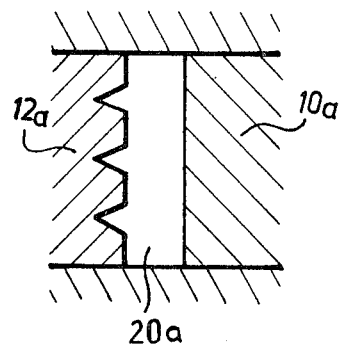
FIGS. 2a and 2b are two sectional views of respective orifices formed by two lips at least one of which is movable.
Figure 2B:
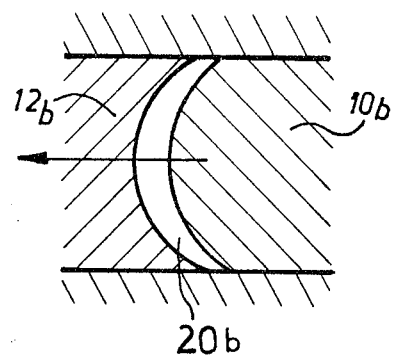

The movability of the two lips is absolutely indispensible when the size of the orifice 20 becomes substantial. It is possible in the case of small thicknesses of extruded sheet to eliminate the obturator 9 and achieve its action by bringing the lips closer together except when the shape of the opposing faces of the lips are striated or provided with a particular form as shown, for example, at 12a in FIG. 2A, the lip 10a of orifice 20a being rectangular as before. FIG. 2B shows an orifice 20b of curved shaped defined by the shape of the facing surface of lips 12b and 10b, this arrangement being particularly effective, for sheets which are to be blown or stamped in the lateral direction in a mould, to reduce variation of thickness of the shaped product which is obtained.

Figure 3:
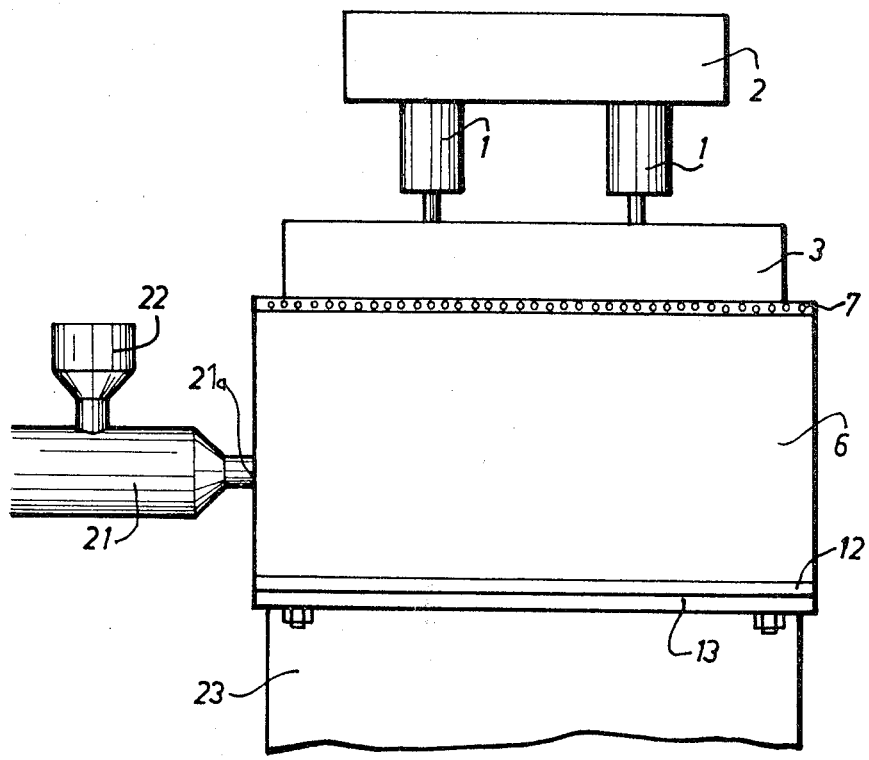
FIG. 3 is a diagrammatic front elevation view of an assembly of the accumulation chamber, the extrusion head and a supply means for plastic material.

FIG. 3 shows at 22 a feed hopper for supply of material to feed screw 21 which delivers the material in plastic state to the accumulation chamber 16 via inlet conduit 21a which leads to feed orifice 19. FIG. 3 shows the use of two cylinders 1 for acting on piston 3, both cylinders being secured to frame 2. As seen in FIG. 3, the electrical resistances 7 extend along the sides of body 6 around chamber 16. The sheet 23 is extruded between lips 10 and 12 in a downwardly direction. The operation is discontinuous or periodic in the sense that piston 3 extrudes plastic material through the extrusion orifice in an amount such that the weight of the extruded sheet is approximately equal to the weight of the product to be obtained. The extruded sheet is cut and moulded to form said product as will be explained later.

Figure 4:
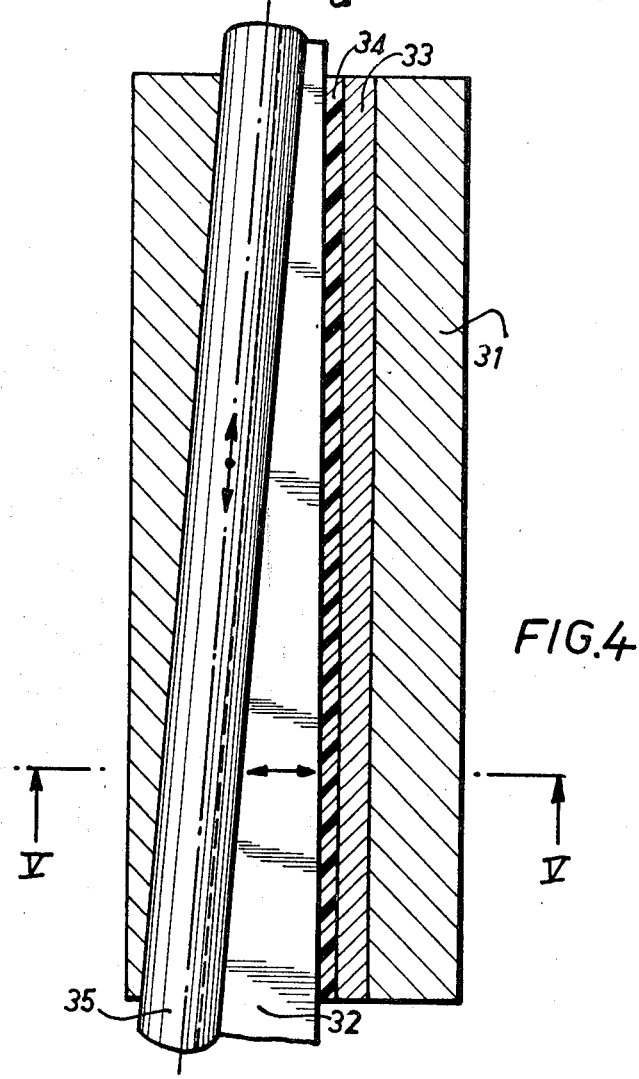
FIG. 4 is a sectional view taken on line IV—IV in FIG. 5 showing one movable lip operated under the action of an oblique slide member.

FIG. 4 shows another embodiment of the movable lips according to the present invention. In the body of the extrusion head 31 there are two lips 32 and 33. The lip 33 is shown as being fixed although it could be movable as is lip 32, which under the control of oblique slide member 35, moves along the length of the extrusion orifice 34 to control the thickness of the extruded sheet.

Figure 5:
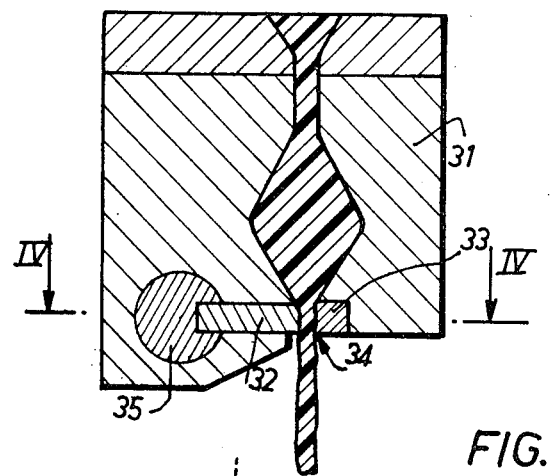
FIG. 5 is a sectional view taken along line V—V in FIG. 4.

Referring to FIG. 5 therein is seen body 31 of the extrusion head which is provided with grooves respectively receiving the fixed lip 33 and the movable lip 32 which is fixed to slide member 35. As explained previously, the lip 33 can be rendered movable and this can be effected simply by utilizing an associated slide member similar to member 35.

An advantage of the use of the arrangement of FIGS. 4 and 5 is a great sensitivity of the system and the fineness of regulations of the thickness of the sheet.

Figure 6:
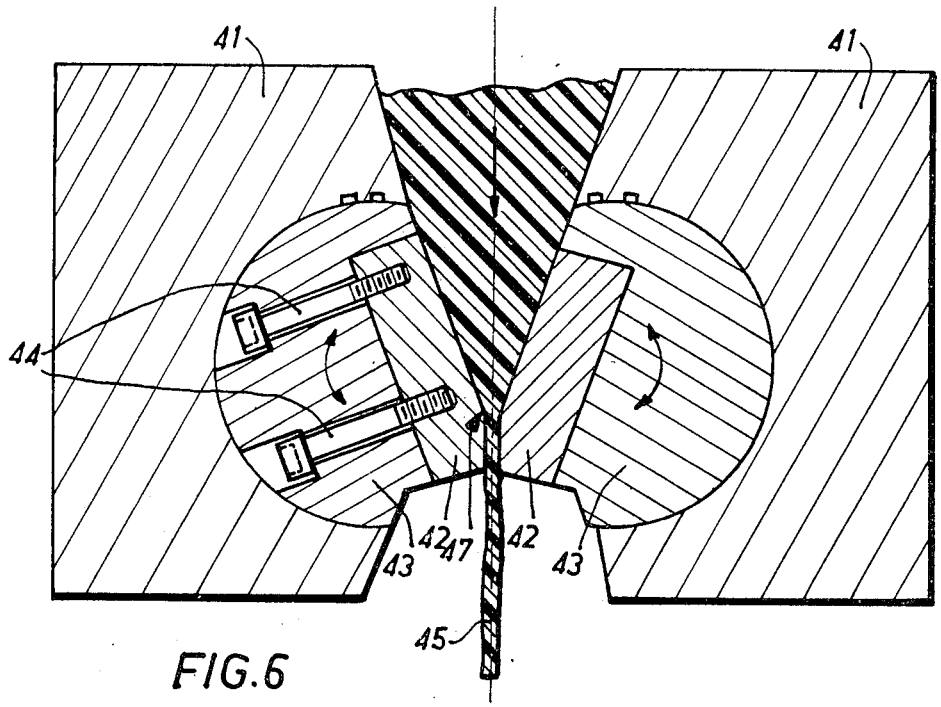
FIG. 6 is a sectional view of another embodiment of movable lips operated by turnable spindles.

FIG. 6 shows a different system of movable lips and here two movable lips 42 are respectively fixed to two turnable spindles 43 by screws 44 (only one pair of which is shown). The assembly of lips and spindles is supported in body 41 of the extrusion head at the bottom of which there if formed a groove extending across the entire width of the head to permit easy cleaning of the movable lips 42. By turning the spindles 43 in one direction or the other, the movable lips 42 can be made to increase or decrease the size of the orifice 47 therebetween at the exit of the extruded sheet 45 from the head.

Figure 7:
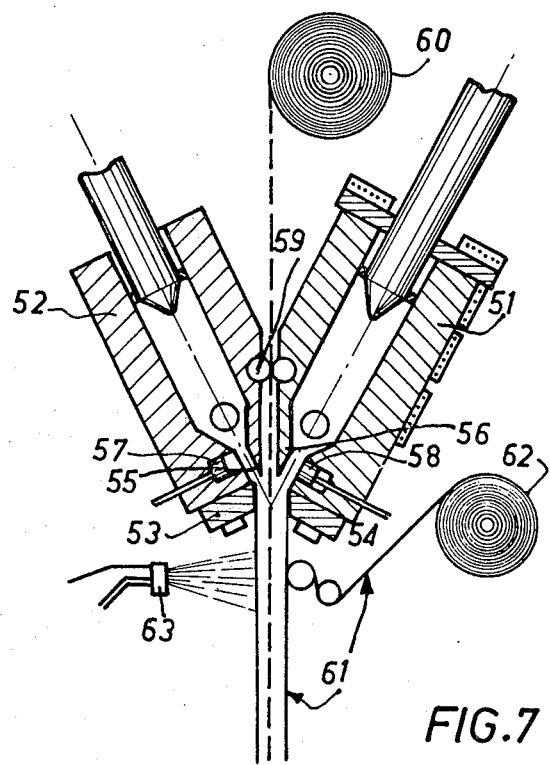
FIG. 7 is a sectional view of a pair of extrusion heads for obtaining a composite sheet product.

FIG. 7 shows a specific embodiment for the utilization of the invention. In FIG. 7 are seen a pair of accumulation chambers and extrusion heads 51 and 52 composed of the diverse parts represented in FIG. 1. However, on each of these heads there is mounted a single movable lip 53 and 54, and these cooperate with the respective fixed lips 55 and 56. The lips 55 and 56 are formed as integral parts of the heads 52 and 51 respectively. The lips 53 and 54 are movable with respect to the bodies of the two heads and thus permit control of the nominal thickness of the sheets extruded from the heads. The sheets of controlled thickness are extruded from the heads in a plastic state and are joined to form a composite sheet due to the inclined relation of the outlet orifices and their proximity. The discharge of either of the sheets can be selectively interrupted by the operation of the obturators 57 and 58 or the lips 53 or 54 to reduce the thickness of the extruded composite sheet at the locations, for example, which can serve as hinges. It is also possible to reduce the speed of extrusion of one sheet with respect to the other. As before, the thickness of each of the sheets can be modified in the course of its extrusion.

The composite sheet thus obtained, without reheating of the sheets or without a roll press, can be reinforced, for example, by a mat which is unrolled from roll 60 and advanced by guides 59 between the two extruded sheets before their joinder. Additionally, a roll 62 of reinforcing material or decorative material can be provided and this material 61 can be placed on one or both external surfaces of the resulting composite sheet. Furthermore, a surface coating can be formed on one or both external surfaces of the composite sheet by means of sprayer 63.

Figure 8A:
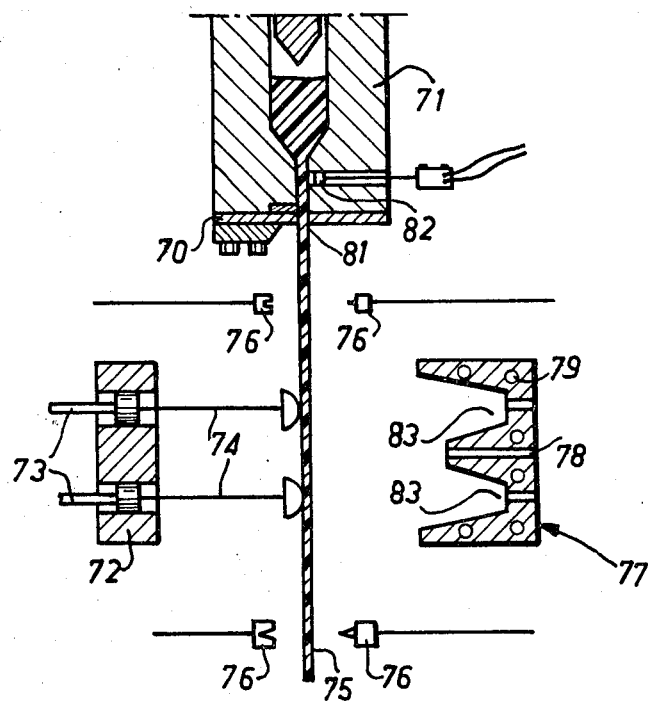
FIGS. 8a and 8b diagrammatically illustrate the use of two side cutters which are independent of the mould and shaping rods.

FIG. 8a shows a particular embodiment of the overall apparatus for effecting extrusion of a sheet and moulding of a product therefrom according to the invention. In this embodiment there are formed products of particular and uniform thickness by employing in combination:

1. an extrusion head 71 with at least one movable lip 70 whose movement compensates the material flow characteristics, i.e. the slip phenomena in the course of extrusion of the sheet 75 whereby an extruded sheet of uniform thickness is obtained.

2. cutters 76 for cutting a length from the extruded sheet and holding the same before the subsequent moulding operations and after obturation of the extrusion orifice 81 by obturator 82 or movable lip 70. The cutters can be formed as closed rings or frames of circular or polygonal shape through which the extruded sheet travels or as independent cutter bars which are straight or profiled.

3. plungers 74 slidable in the body of countermould 72 under the action of pistons 73 which are mechanically, hydraulically or pneumatically driven for deforming the sheet of material cut by cutters 76 into the deep cavities 83 of mould 77. The mould 77 is provided with air channels 78 and with ducts 79 for flow of a coolant. The channels 78 can be connected to a suction source if vacuum moulding is contemplated.

Figure 8B:
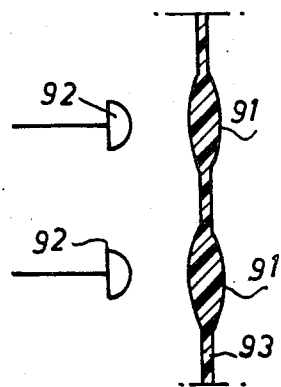

FIG. 8b shows a sheet of material 93 formed by the apparatus of FIG. 8a wherein the movable lip is retracted periodically in superposition with its gradual retraction to compensate for slip, so as to form enlargements 91 along the length of the extruded sheet. The enlargements are so located on the sheet to face the plungers 92 so as to be acted on thereby in the course of deformation of the sheet into the cavities of the mould. Thereby there is no longer any risk of obtaining a reduced thickness in the moulded product at the deepest portions of the mould or at corners thereof, and in fact the additional thickness at 91 can be such as to compensate for its greater deformation to yield a product of substantially uniform thickness. When the mould is closed by bringing the half-moulds together in a moulding operation, the shaped product is separated from the cutters which tentatively hold the sheet until such moulding operation is effected. Alternatively, the cutters can be entrained for movement with the half-moulds so that when the mould is closed, the cutters separate the shaped product from the remainder of the extruded sheet.

Numerous modifications and variations to the disclosed embodiments will now become apparent to those skilled in the art, but these will not be deemed to depart from the scope and spirit of the invention if defined by the appended claims.

What is claimed is:

1. Apparatus for extruding and moulding a plastic material to form a shaped product, said apparatus comprising a vertical accumulation chamber, feed screw means for supplying plastic material to said chamber, an extrusion head coupled to said accumulation chamber and including means defining an extrusion orifice, vertically movable piston means extending into said accumulation chamber, means for reciprocally moving said piston vertically such that in the downstroke of the piston plastic material accumulated in said accumulation chamber is extruded downwardly through said orifice to form an extruded sheet of material, and means for moulding said sheet to form a shaped product, said means which defines the extrusion orifice including opposed members bounding said orifice, means supporting at least one of said members for displacement in a direction to adjust the width of said orifice and thereby the thickness of the extruded sheet, and means to progressively increase the width of the orifice during extrusion by displacing said one member so as to compensate for the tendency of the sheet to be non-uniform in thickness over its length due to slip phenomena.

2. Apparatus as claimed in claim 1 comprising obturator means for selectively blocking said extrusion orifice.

3. Apparatus as claimed in claim 1 comprising heating means for maintaining the material in plastic state in said chamber.

4. Apparatus as claimed in claim 1 wherein said piston means includes a piston having a bore through which a heating medium can be circulated to control heating of the piston.

5. Apparatus as claimed in claim 1 wherein said one member is a horizontally displaceable plate.

6. Apparatus as claimed in claim 5 wherein said opposed members have curved surfaces to define a curved extrusion orifice.

7. Apparatus as claimed in claim 1 wherein said means supporting said one member comprises a turnable spindle, said one member being fixed to said spindle to travel therewith and vary the width of the extrusion orifice by rotation of said spindle.

8. Apparatus as claimed in claim 1 wherein said means supporting said one member comprises an oblique slide member, said one member being fixed to said slide member to travel therewith obliquely with respect to said extrusion orifice thereby to vary its width in accordance with the location of the slide member.

9. Apparatus as claimed in claim 1 wherein the moulding means comprises a mould adapted to receive the extruded sheet to form the shaped product, a counter mould facing the first said mould, and a slidable plunger member positioned in said counter mould for pressing a selected portion of the extruded sheet into the mould prior to closure of the mould.

10. Apparatus as claimed in claim 9 comprising cutter means on opposite sides of the mould for separating from the extruded sheet a section to be moulded as the shaped product.

11. Apparatus as claimed in claim 10 wherein said cutter means comprises a closed ring of circular or polygonal shape, through which the extruded sheet passes.

12. Apparatus as claimed in claim 10 wherein said cutter means comprises independent cutter elements on opposite sides of the extruded sheet.

13. Apparatus as claimed in claim 1 wherein said piston means includes a piston having a rectangular section.

14. Apparatus as claimed in claim 1 wherein said piston means includes a piston having a circular section.

* * * * *